United States Patent
Mueller

(10) Patent No.: US 11,548,822 B2
(45) Date of Patent: *Jan. 10, 2023

(54) COMPOSITE CEMENTITIOUS DISCRETE-ELEMENT FEEDSTOCK

(71) Applicant: Robert P. Mueller, Cocoa Beach, FL (US)

(72) Inventor: Robert P. Mueller, Cocoa Beach, FL (US)

( * ) Notice: Subject to any disclaimer, the term of this patent is extended or adjusted under 35 U.S.C. 154(b) by 509 days.

This patent is subject to a terminal disclaimer.

(21) Appl. No.: 16/745,575

(22) Filed: Jan. 17, 2020

(65) Prior Publication Data

US 2021/0221738 A1    Jul. 22, 2021

(51) Int. Cl.

| | |
|---|---|
| *C04B 18/02* | (2006.01) |
| *C04B 20/10* | (2006.01) |
| *C04B 14/06* | (2006.01) |
| *C04B 20/00* | (2006.01) |
| *C04B 14/30* | (2006.01) |
| *C04B 111/28* | (2006.01) |
| *C04B 103/00* | (2006.01) |

(52) U.S. Cl.
CPC ............ *C04B 18/028* (2013.01); *C04B 14/06* (2013.01); *C04B 14/308* (2013.01); *C04B 20/0048* (2013.01); *C04B 20/1029* (2013.01); *C04B 2103/0051* (2013.01); *C04B 2111/28* (2013.01)

(58) Field of Classification Search
CPC ........... C04B 7/02; C04B 14/06; C04B 14/14; C04B 14/308; C04B 18/021; C04B 18/028; C04B 20/0048; C04B 20/1022; C04B 20/1029; C04B 24/24; C04B 24/2623; C04B 24/2635; C04B 24/2641; C04B 24/2676; C04B 24/38; C04B 28/02; C04B 40/001; C04B 40/0042; C04B 40/0082; C04B 2103/0051; C04B 2111/28
See application file for complete search history.

(56) References Cited

U.S. PATENT DOCUMENTS

| | | | |
|---|---|---|---|
| 9,884,785 B2 * | 2/2018 | Liguori | ............... C04B 24/2641 |
| 10,618,843 B2 * | 4/2020 | Hendrickson | .......... B01J 20/262 |
| 2020/0188879 A1 * | 6/2020 | Iftime | .................... B01J 20/262 |

FOREIGN PATENT DOCUMENTS

KR       10-1363982 B1 *    2/2014    ......... C04B 16/0641

* cited by examiner

*Primary Examiner* — Anthony J Green
(74) *Attorney, Agent, or Firm* — Peter J. Van Bergen

(57) ABSTRACT

A composite cementitious feedstock comprises discrete elements. Each discrete element includes mineral rock agglutinates having irregular surface regions and cavities. Super absorbent polymer (SAP) particles and cement particles are disposed on the irregular surface regions and in the cavities. A binder coheres the agglutinates, SAP particles, and cement particles.

26 Claims, 5 Drawing Sheets

COMPOSITE CEMENTITIOUS DISCRETE-ELEMENT FEEDSTOCK

FIELD OF THE INVENTION

The invention relates generally to cementitious materials, and more particularly to a composite cementitious material in the form of a discrete element suitable for use as feedstock in mortar and concrete construction systems.

BACKGROUND OF THE INVENTION

Concrete materials used in construction applications typically include mineral-based cement mixed with rock aggregate and sand. For example, the well-known and widely-used Portland cement is produced by firing a mixture of finely ground clay and limestone. The rock aggregates and sand that are added to the cement to make concrete can be pre-mixed with the cement in a granular material form and packaged, or can be added separately as an ingredient when mixing the cement powder with water in order to create a concrete slurry. This resulting concrete slurry can then be transferred into a mold, formwork or directly applied by hand, or in a "spray on" type of operation. The addition of water initiates a hydration process that causes an exothermic chemical reaction that ultimately results in the curing and hardening of the concrete material into a synthetic rock.

When cement is mixed with a fine aggregate such as sand, then it is called a mortar. When fine sand or other fine rock material is mixed with cement and used to fill gaps between tiles or in industrial applications such as oil wells, then it is called a grout. When cement is mixed with fine and coarse aggregates, then it is called a concrete, which typically has a higher strength and lower cost than mortar or grout, due to less cement used and the high strength of the included rock aggregates. A variety of other cements have been developed, such as calcium aluminate cements, pozzolanic cements, lime concrete/mortar and expansive cements, but the quantities of these other cements used worldwide are small compared with composite cements based on Portland cement. Composite cements (also known as blended cements) contain Portland cement and other reactive inorganic material that contribute significantly to the hydration process. The most common examples of such mineral additives are fly ash, microsilica, metakaolin, volcanic glass, blast furnace slag, and limestone. The additives can significantly improve concrete performance in terms of improved strength or durability. In addition, admixtures such as super plasticizers, accelerators, water reducers/retarders, and other process performance related advantageous materials can be used. Reinforcement materials such as chopped glass fibers, carbon fibers, KEVLAR fibers, polymer strands, or steel reinforcing bar can also, or alternatively, be added to improve material strength.

Currently, existing concrete automated additive construction systems (also known as three-dimensional (3D) printing systems) are fed with a wet Portland cement concrete slurry that is pre-mixed and then pumped through a hose to a print head nozzle where it is extruded to form additive layers successively that results in a monolithic structure after the concrete cures. The concrete slurry must be mixed and maintained at the correct viscosity in order to prevent slumping or crumbling at the print head application location. The exothermic concrete slurry mixture can suffer from thermal runaway issues making it hard to control the concrete application and curing properties. Cleanup of the mixing system, pump, hoses and extrusion print head is difficult and time consuming since it must be manually flushed out with water before the concrete slurry cures and hardens to clog the pumping system, hoses and print head. The existing concrete 3D printing systems cannot be turned on and off as needed without extensive hose and print head cleaning operations. Complex procedures are required to control the material mix, rheology, and consistency. If the mix is not correct, then an entire large scale structure could be compromised due to insufficient structural strength, cracking, slumping or creep caused by poorly mixed and/or poorly applied concrete slurry.

SUMMARY OF THE INVENTION

Accordingly, it is an object of the present invention to provide a cementitious product that improves the automated additive construction three-dimensional (3D) concrete printing process.

Another object of the present invention is to provide a cementitious product that improves the end-product structure constructed by a three-dimensional (3D) concrete printing process.

Still another object of the present invention is to provide a cementitious product that simplifies the handling thereof prior to and during its use for concrete construction.

Other objects and advantages of the present invention will become more obvious hereinafter in the specification and drawings.

In accordance with the present invention, a composite cementitious feedstock comprises a plurality of discrete elements. Each discrete element includes mineral rock agglutinates having irregular surface regions and cavities originating at their irregular surface regions. Super absorbent polymer (SAP) particles are disposed on the irregular surface regions and in the cavities. Cement particles are disposed on the irregular surface regions and in the cavities. A binder is provided to cohere the agglutinates, SAP particles, and cement particles.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention is a composite cementitious discrete element that can be used in the making of concrete. Briefly, to make concrete, a plurality of the present invention's discrete elements are activated by being mixed with water and/or electromagnetic energy heating and/or electrical resistance heating depending on how the discrete elements are configured. As used herein, activation of the discrete elements initiates the conversion of the composite cementitious material to a wet concrete. However, in all of embodiments of the present invention, the discrete elements can be conveyed in a dry state as feedstock to a dispensing apparatus (e.g., a 3D printer, concrete boom etc.) or into a structural form (e.g., bed, floor, wall, etc.) just prior to activation by water and/or electromagnetic energy and/or electric resistance heating. In this way, the problems associated with mixing, transporting, and dispensing wet concrete slurries are eliminated.

In general, each discrete element in accordance with the present invention has agglutinate-based constituents cohered by a binder that dissolves or dissipates at time of activation. A variety of non-limiting embodiments of such agglutinate-based constituents will be described herein. While the various embodiments described herein may differ by a single feature, it is to be understood that the features of two or more of the described embodiments could be combined to define another embodiment without departing from the scope of the present invention.

Figure 1:
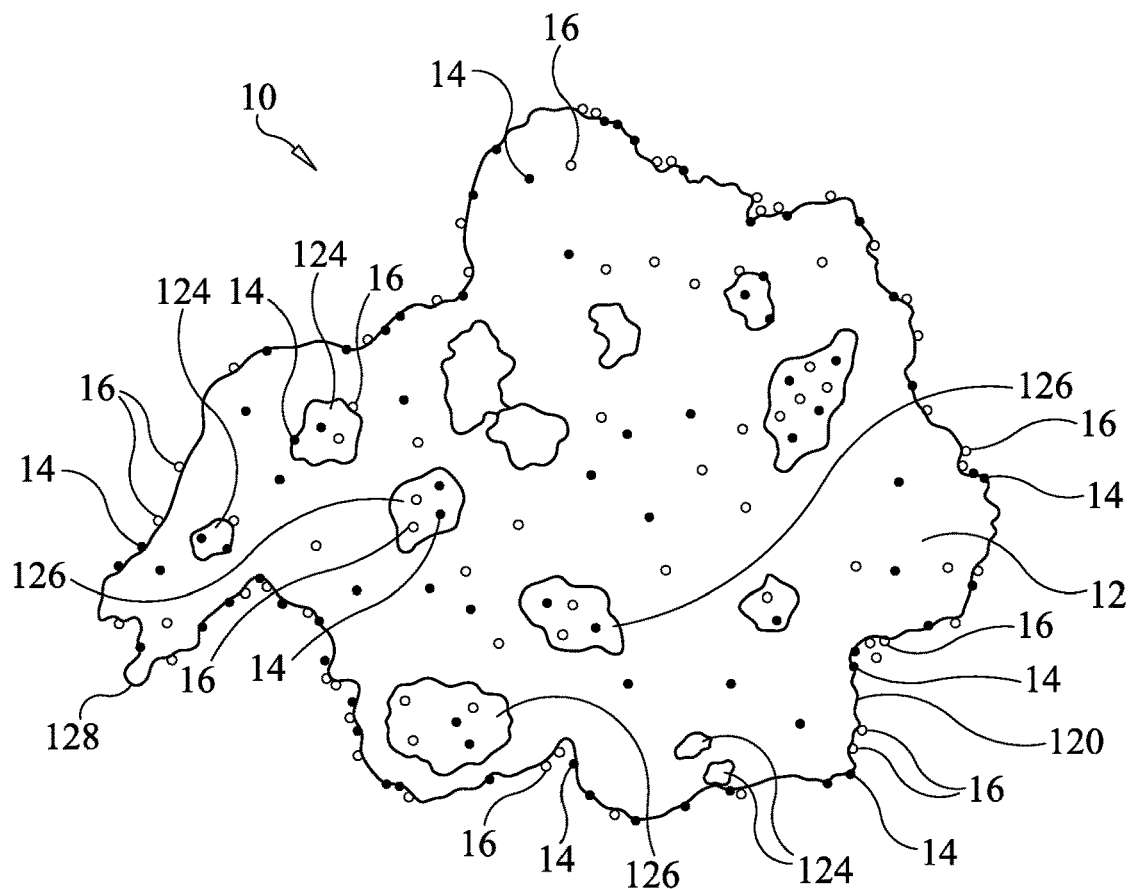
FIG. 1 is a schematic view of an agglutinate-based constituent of a composite cementitious discrete element in accordance with an embodiment of the present invention.

Referring now to the drawings and more particularly to FIG. 1, a basic embodiment of an agglutinate-based constituent for use in the present invention is shown and is referenced generally by numeral 10. The three basic features included in constituent 10 are a mineral rock agglutinate 12, a plurality of super absorbent polymer (SAP) particles 14, and a plurality of cement particles 16. Each of these features of constituent 10 will be described further below.

Mineral rock agglutinate 12 can be a naturally-occurring or man-made mineral rock agglutinate without departing from the scope of the present invention. While naturally-occurring mineral rock agglutinates are generally found on the Moon but not on Earth, man-made simulants of lunar agglutinates are known in the art. For example, a man-made agglutinate could be made by plasma melting basalt rock and dropping the molten basalt rock into a water bath causing it to rapidly cool to ambient temperature. Other methods of melting rock include the use of lasers or solar concentrators. Accordingly, it is to be understood that a variety of rock melting processes can be used to form agglutinate-like glassy particles on Earth. Additional suitable mineral rock materials that can be used to make lunar-simulating agglutinates include, but are not limited to, olivine, pyroxene, and plagioclase feldspar (i.e., anorthosite). For purposes of the present invention, sizes of agglutinate 12 typically are in the range of 250 microns to 1000 microns.

Regardless of the type of mineral rock(s) used for agglutinate 12 or the sizes thereof, all such agglutinates are defined by a highly irregular surface 120. As would be understood in the art, the term "irregular surface" as it applies to lunar-simulated agglutinates refers to a variety of irregular surface features that can include sharp and smooth surface undulations, pocks, pores or cavities, dendritic-like tentacles, etc., and that such surface features are unique to every agglutinate. To maintain clarity of illustration, just a few surface features originating at surface 120 are shown and referenced in FIG. 1. More specifically, irregular surface 120 includes undulating surface regions 122, pocks 124, pores or cavities 126, and dendritic-like tentacles 128.

Disposed on the surface features of surface 120 and in cavities 126 are SAP particles 14 and cement particles 16. It is to be understood that the number and arrangement of particles 14 and 16 illustrated in FIG. 1 are merely for purposes of illustration. In actuality, the number of SAP particles 14 and cement particles 16 will be far greater than that illustrated and relative sizes will vary. In all cases, locations of particles 14 and 16 on surface 120 and in cavities 126 are random. For clarity of illustration, only a few of SAP particles 14 and cement particles 16 are indicated with reference numerals. For purposes of the present invention, sizes of SAP particles 14 range from 1 micron to 120 microns (i.e., as defined by the American Society for Testing and Materials (ASTM) E11 sieve #120) and cement particles 16 typically range from sub-micron to 100 microns.

SAP particles 14 can be any of a variety of super absorbing polymers having a water absorption capacity that greatly exceeds their own mass. Some hydrogels can absorb up to thousands times more water than their dry weight. By way of non-limiting examples, typical super absorbing polymers for use in the present invention could include the following known and/or commercially-available SAPs:

hydrophilic polymers that can be developed to be biodegradable and biocompatible, and can be synthetized from a variety of synthetic (e.g., poly(vinyl alcohol) (PVA), poly (ethylene glycol) (PEG) and poly(propylene fumarate) (PPF) or natural (e.g., alginate, gelatine, hyaluronic acid, fibrin and chitosan) resources;

poly (meth) acrylates of alkaline salts, starches grafted with a (meth) acrylic polymer, hydrolysed starches grafted with a (meth) acrylic polymer; polymers based on starch, gum, and cellulose derivative, and mixtures thereof;

polymers resulting from the polymerization with partial crosslinking of hydrosoluble ethylenically unsaturated monomers, such as acrylic or methacrylic polymers (resulting especially from the polymerization of acrylic and/or methacrylic acid and/or of acrylate and/or methacrylate monomers) or vinyl, in particular crosslinked and neutralized poly (meth) acrylates, especially in the form of a gel, and the alkaline salts such as the sodium or potassium salts of these polymers;

starches grafted with polyacrylates;

acrylamide/acrylic acid copolymers, typically in the form of salts, especially of alkaline salts and in particular of sodium or potassium salts;

acrylamide/acrylic acid grafted starches, typically in the form of salts, especially of alkaline salts and in particular of sodium or potassium salts;

the salts, in particular the alkaline salts and in particular the sodium or potassium salts, of carboxymethylcellulose;

the salts, in particular the alkaline salts and in particular the sodium or potassium salts, of crosslinked polyaspartic acids; and the salts, in particular the alkaline salts and in particular the sodium or potassium salts, of crosslinked polyglutamic acids, and mixtures thereof.

Cement particles 16 can be any of variety of known cements. By way of non-limiting examples, typical cements for use in the present invention could include the following:

Portland cement and Portland cement blends;
Pozzolan-lime cements;
Silica fume cements;
Calcium aluminate cements;
Gypsum cements;
Hydroxyapatite (phosphate mineral) cements;
Magnesia-ammonium phosphate cements;
Geopolymer cements;
Magnesium oxide or basalt-based cements;
Cements made by made by burning septaria;
Rosendale natural cements;
Blast slag-lime cements;
Supersulfated cements;
Calcium sulfoaluminate cements; and
Cements produced by burning argillaceous limestones at moderate temperatures.

Figure 2:
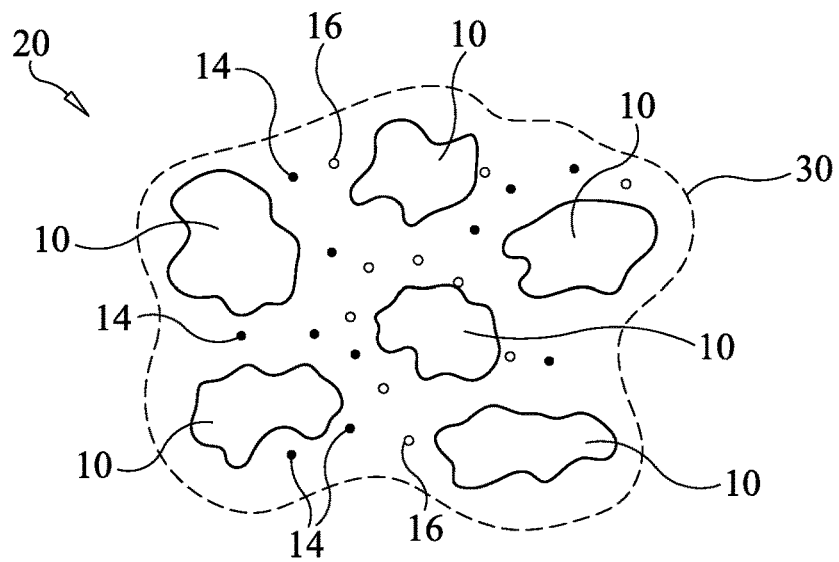
FIG. 2 is a schematic view of composite cementitious discrete element using a plurality of the agglutinate-based constituent illustrated in FIG. 1 in accordance with the present invention.

Referring now to FIG. 2, a composite cementitious discrete element in accordance with an embodiment of the present invention is shown and is referenced generally by numeral 20. Discrete element 20 includes a binder 30 for cohering a plurality of the above-described constituents 10 (i.e., agglutinate 12 with particles 14 and 16 thereon) and additional SAP particles 14 and cement particles 16 dispersed amongst constituents 10 and throughout discrete element 20. As will be explained further below, binder 30 can be realized using a binder material or electrostatic charges without departing from the scope of the present invention. However, in all cases, binder 30 dissolves or dissipates when discrete element 20 is activated to initiate its conversion to a wet concrete.

When discrete element 20 is to be activated by water, binder 30 is a binder material that is water soluble. For example, water-soluble binder materials include synthetic/semisynthetic water-soluble polymers such as polyvinylpyrrolidone, poly vinylsulfonate, polyacrylic acid, polymethacrylic acid, poly 2-acrylamido-2-methylpropanesulfonic acid, polyacrylamide, polystyrenesulfonate, partially hydrolyzed polyvinylacetate, polyethylene glycol, polyvinyl alcohols, copolymers thereof, and mixtures thereof. Other examples are methyl cellulose, hydroxy propyl methyl cellulose, hydroxy propyl cellulose, sodium carboxy methyl cellulose and natural binders such as gelatin, starch and cellulose. When binder 30 is a water-soluble material, discrete element 20 contains 1-30 weight percent of binder 30 and 70-99 weight percent of constituents 10 and the additional SAP particles 14 and cement particles 16 dispersed amongst constituents 10 and throughout the discrete element.

The material used for binder 30 can be nonflammable for applications requiring this feature. In such cases, a sufficient amount of a flame retardant could be added to binder 30 to make it nonflammable. A variety of flame retarding materials is well known in the art.

Figure 3:
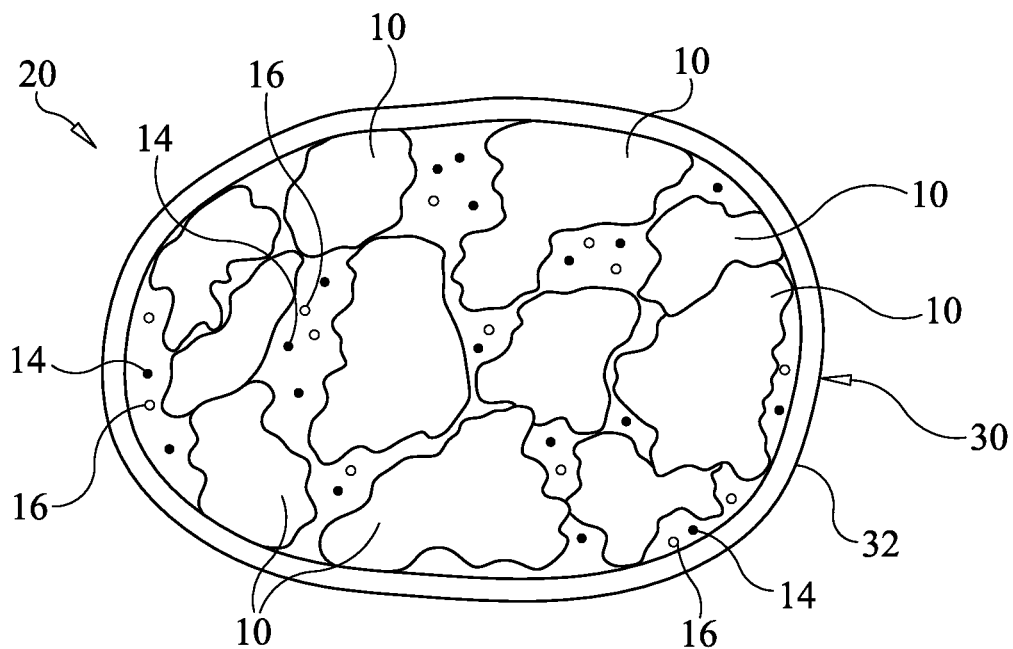
FIG. 3 is a schematic view of a composite cementitious discrete element whose binder is an encapsulating outer layer in accordance with an embodiment of the present invention.
Figure 4:
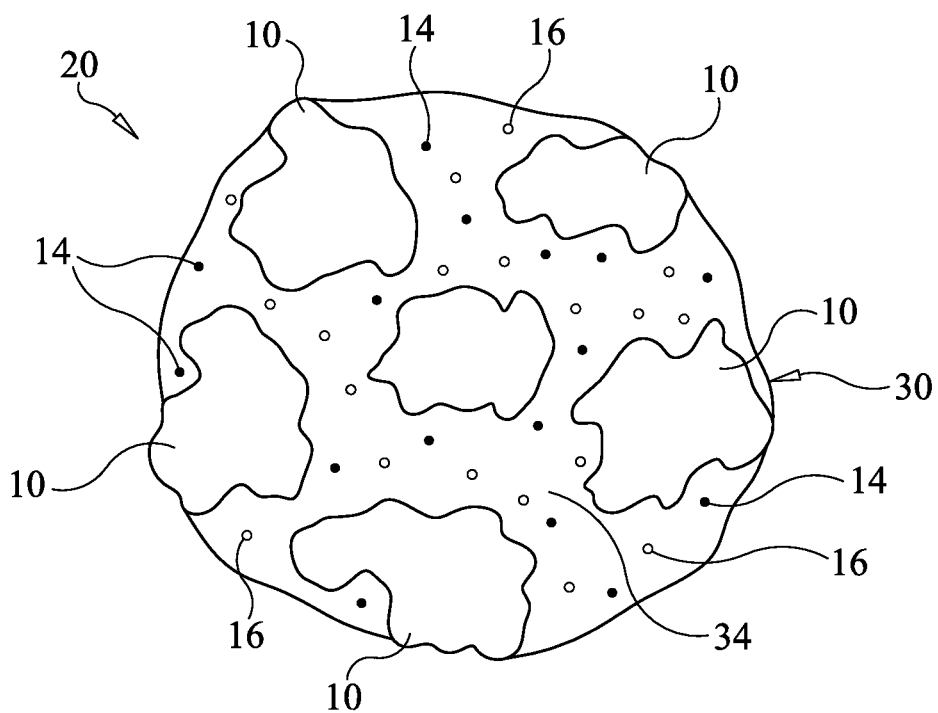
FIG. 4 is a schematic view of a composite cementitious discrete element whose binder is dispersed throughout the discrete element in accordance with another embodiment of the present invention.

A material-based binder 30 can also be realized as an encapsulating outer layer 32 of discrete element 20 as illustrated in FIG. 3. However, the present invention is not so limited as a material-based binder 30 could also be realized as a dispersant 34 throughout all of discrete element 20 as illustrated in FIG. 4. Still further, a material-based binder 30 could be realized as a combination of a dispersant 34 of the discrete element and an encapsulating outer layer 32 of the discrete element without departing from the scope of the present invention.

Figure 5:
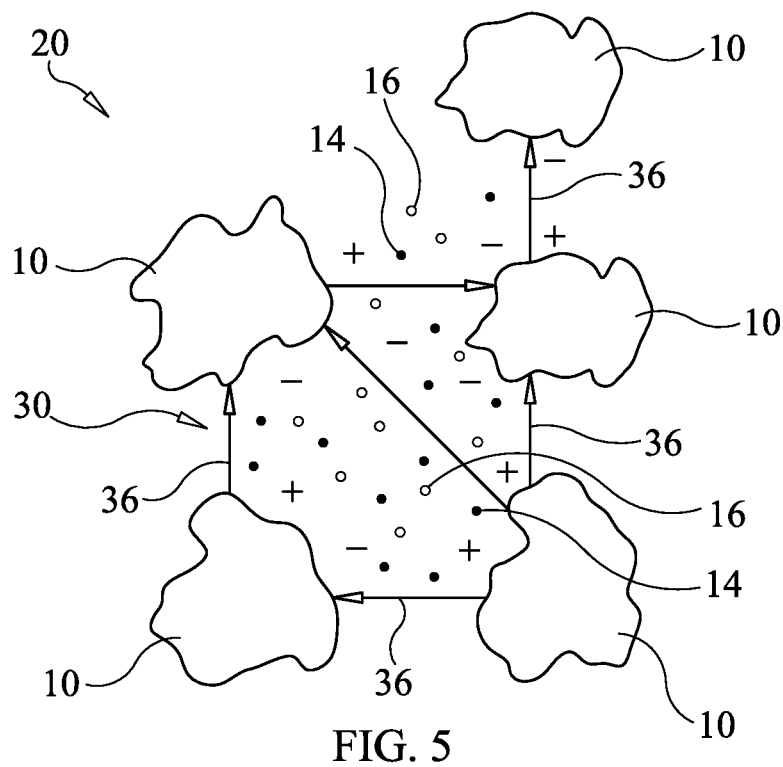
FIG. 5 is a schematic view of a composite cementitious discrete element whose binder is generated by electrostatic charges in accordance with another embodiment of the present invention.

As mentioned above, binder 30 can also be realized by electrostatic charges between constituents 10 and the additional SAP particles 14 and cement particles 16 as illustrated in FIG. 5 where the attractive forces 36 developed between "+" and "−" electrostatic charges in discrete element 20 are shown. For clarity of illustration, only a few of such attractive forces are illustrated. Furthermore and as would be understood in the art, attractive forces 36 would retain the parts of discrete element 20 in a close-pack relationship. That is, the spaced-apart relationships of the parts of discrete element 20 shown in FIG. 5 are merely for purposes of illustration. The electrostatic charges can be introduced during fabrication of the discrete element via the process known as turbocharging, i.e., processing through pneumatic conveying and cyclone devices or by exposure to an electrically charged field. To activate discrete element 20 shown in FIG. 5, water is added whereby the electrostatic charge bleeds off as the humidity creates electrical conduction paths in which electrons can travel and neutralize the existing charges. The loss of opposite charges on the particles causes a loss of electrostatic cohesion so the particles are able to separate and mix freely to activate the cement mixture.

Figure 6:
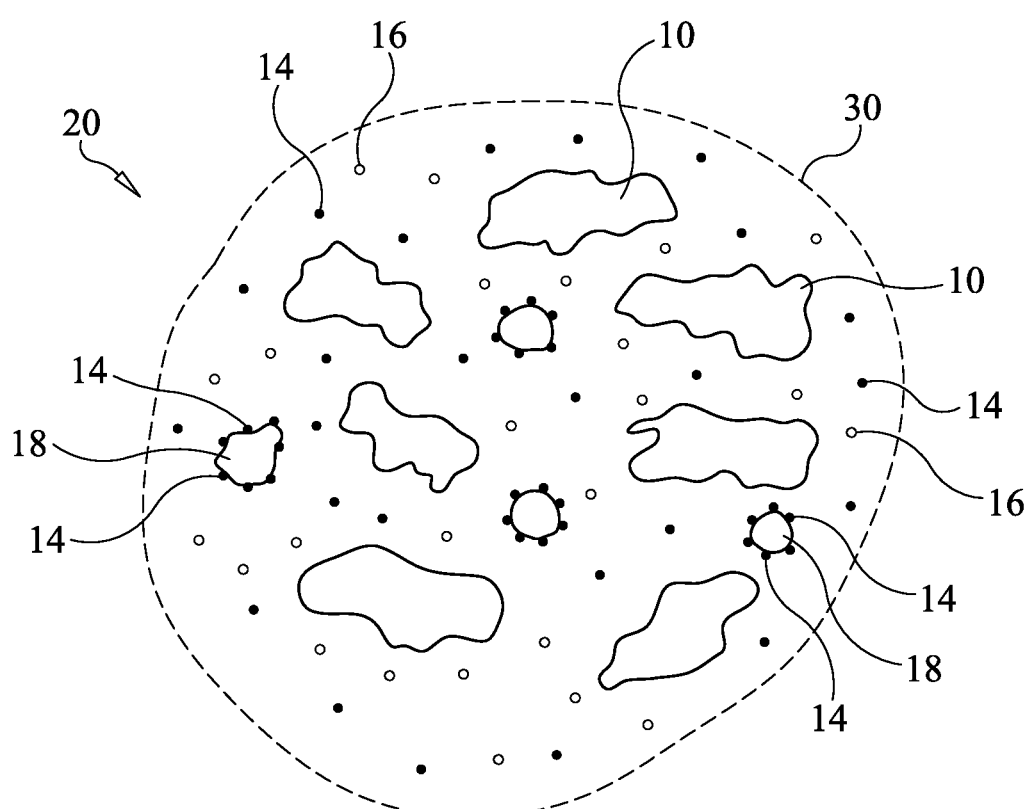
FIG. 6 is a schematic view of a composite cementitious discrete element including SAP-coated sand particles in accordance with another embodiment of the present invention.

Another embodiment of a discrete element 20 is illustrated in FIG. 6 where particles of mineral sand 18 are dispersed throughout the discrete element. More specifically, sand particles 18 are partially or fully coated with SAP particles 14. The SAP-coated sand particles can be dispersed throughout the discrete element to include on the surface of agglutinates and in the cavities thereof. For purposes of the present invention, sizes of sand particles 18 typically are in the range of from 53 microns (i.e., as defined by ASTM sieve #270) to 150 microns (i.e., as defined by ASTM sieve #100) average diameter. The coated sand particles are efficient carriers of the SAP so that the SAP can be evenly distributed and mixed within the dry cement composite mixture. When water is added to begin activation, the SAP absorbs the water to thereby form an adhesive layer of water around the sand particles due to its hydrophilic property aided by the cohesion of the water molecules and the corresponding surface tension of the water film that forms around each sand particle. The result is the formation of a hydrogel surrounding the distributed sand. This efficient distribution of water in the cement mixture prevents self-dessication, which leads to a more consistent hydration process in the cement hardening chemical reaction resulting in improved mechanical properties. The microscopic voids left behind after hydration make the concrete more resistant to freeze and thaw cycles in harsh climates. In addition, the wet SAP creates a significant advantage in the rheology of the wet slurry as it thickens so that slumping is reduced and viscosity is increased, which is advantageous in 3D printing processes. The SAP also creates a reduction in shrinkage or drying out of the concrete. Self-dessicated concrete causes cracking of the structure during curing and needs to be avoided for quality control.

Figure 7:
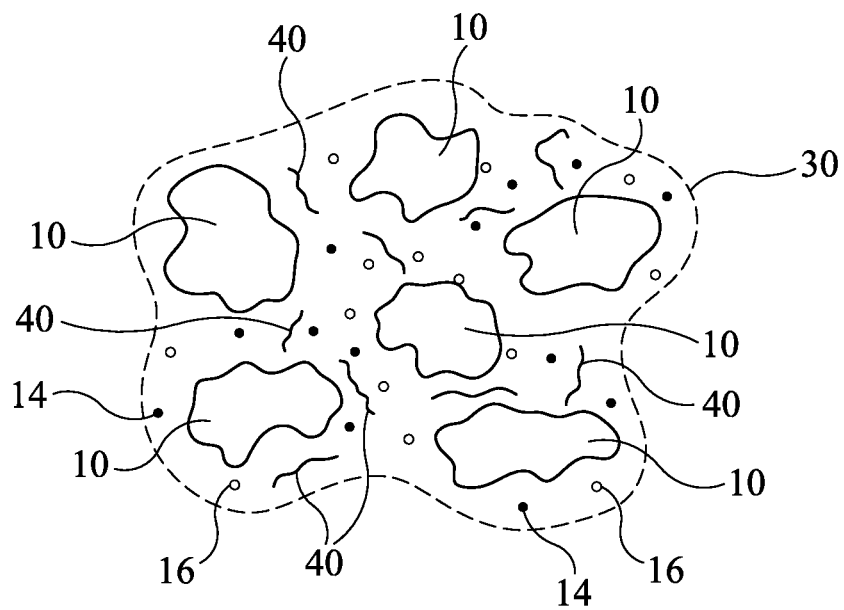
FIG. 7 is a schematic view of a composite cementitious discrete element that includes reinforcement fibers in accordance with another embodiment of the present invention.
Figure 8:
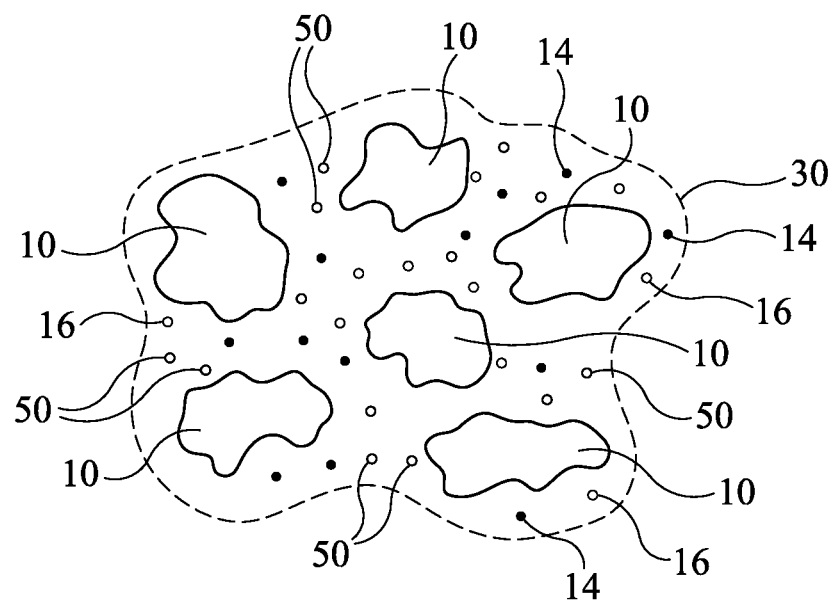
FIG. 8 is a schematic view of a composite cementitious discrete element that includes electromagnetic energy absorbing powder in accordance with another embodiment of the present invention.
Figure 9:
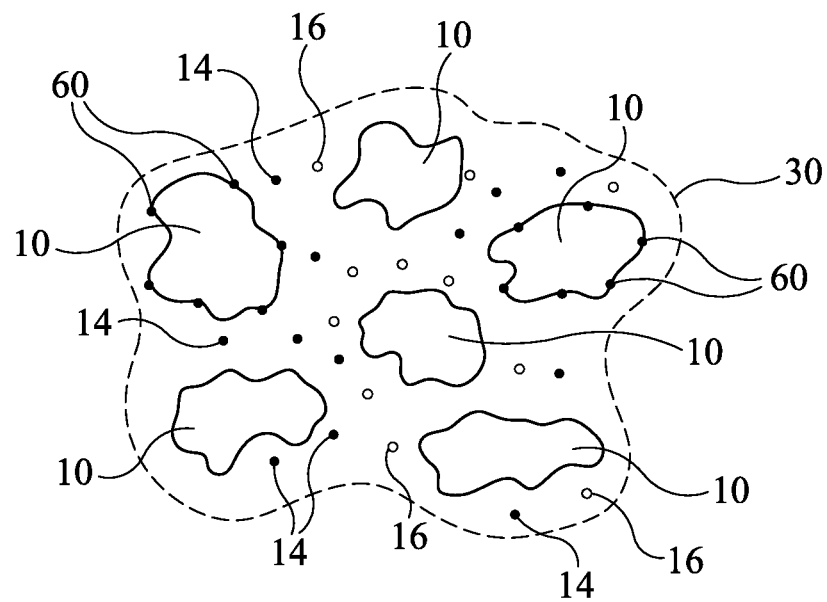
FIG. 9 is a schematic view of a composite cementitious discrete element that includes nanophase iron in accordance with another embodiment of the present invention.

Discrete elements in accordance with the present invention could also include one or more of the features illustrated in FIGS. 7-9. For example and as shown in FIG. 7, each discrete element could include reinforcement fibers 40 dispersed therein that will add strength to the ultimate structure (not shown) once the discrete elements have been activated and ultimately unified/cured. Fibers 40 can be chopped fibers or nano fibers, and can include, for example, glass fibers, hydrocarbon polymer fibers, metallic fibers, carbon fibers, KEVLAR fibers, cellulose, and mixtures thereof.

When discrete elements of the present invention are to be activated solely or additionally by heat, the discrete elements can include powder particles 50 dispersed therein as illustrated in FIG. 8. Powder particles 50 can be any of a variety of commercially-available electromagnetic energy absorbing materials/powders. In general, powder particles 50 are selected from a class of materials that absorb electromagnetic energy in a range of 300 MHz to 300 GHz.

Still another embodiment of a discrete element of the present invention is illustrated in FIG. 9 where some or all of constituents 10 include nanophase iron particles 60 coupled thereto. Nanophase iron is an effective absorber of electromagnetic energy in a range of 300 MHz to 300 GHz (microwaves) and, therefore, can serve as an efficient susceptor to heat the material mixture thereby hastening dissolution of the discrete element's binder and cause a more rapid concrete activation. In addition, a concrete structure containing embedded nanophase iron particles throughout could be post-processed with electromagnetic energy heating to cause sintering of the mineral rock particles to further enhance the strength of a structure.

The advantages of the present invention are numerous. The present invention's novel discrete element feedstock can be introduced into construction systems with water being added in a subsequent step to create a hydrated concrete material. The present invention can be used in the construction of structures that are typically large in scale (e.g., meters to tens of meters or larger, in all linear dimensions). The discrete elements of composite cementitious feedstock can be produced/used in the form of, for example, approximately cylindrical, ellipsoid, spherical shaped pellets/nodules, or combinations thereof. The sizes of the discrete elements can vary depending on the application, and could range from 1 millimeter to 10 centimeters or more in diameter and/or length.

This new type of discrete element feedstock can be used to create self-supporting structures for civil engineering infrastructure, such as, but not limited to, buildings, homes, industrial facilities, bridges, antenna towers, liquid and gas storage tanks, flood barriers, retaining walls, foundations, footers, form work, parking lots, roads, driveways and many other useful structures. Some examples of applications could include disaster mitigation (eg. rapidly construct flood barriers before the flood), military combat (build in-situ blast barriers, barricades and shelters) and affordable custom housing for the global population. The present invention's discrete element feedstock can be emplaced while dry, or as a mixture that is activated by water just in time at an extrusion print head nozzle. Each discrete element's binder initially holds the discrete element together for transportation to a construction site, and conveying to the print head where water and/or additives can be added in a real-time emplacement step in order to dissolve the binder while also initiating concrete hydration and the concrete material's curing process.

The discrete element feedstock enables an effective way of conveying concrete construction material in a non-hazardous fashion since the typically dusty cement and fine sand aggregate is completely contained in the discrete element. It is well known that cementitious dust is a health hazard to construction personnel and can also be detrimental during the construction process if there is wind or other air currents which will blow the cement dust away from its intended site of use. By using discrete element pellets and/or nodules, efficient and potentially automated conveying techniques can be used such as pneumatic conveying, motor driven flexible augers, bucket chains, conveyor belts, ballistic transfer or other means which will enhance construction methods.

Large amounts of concrete are required for construction projects in civil engineering applications. Mixing the concrete slurry on site is difficult and costly, so concrete is often mixed at a centralized plant location and specialized concrete transportation trucks deliver the pre-mixed concrete in a slurry form to the construction site in large batches. The problem with this approach is that the concrete slurry has already been mixed with water thereby commencing the hydration process before the concrete is emplaced. Accordingly, to avoid curing, the wet concrete reaction must be retarded with additives and in order to promote even mixing and segregation of the granular materials of varying sizes (i.e., sand, aggregates), it must be agitated or tumbled in expensive and logistically difficult concrete trucks mounted with large rotating containment vessels. In contrast, by preparing the present invention's discrete element feedstock at a factory site and transporting it to a construction site, the expensive logistics of current slurry concrete transportation and emplacement methods can be reduced substantially. The discrete element feedstock can be delivered and dry stored in bags, or placed in a drier vessel to avoid atmospheric humidity absorption at the construction site for in-situ utilization on demand. Since the discrete element feedstock is pre-mixed in the exact proportions needed, the segregation of materials is avoided and quality control of the mix is maintained throughout transportation, deployment, and application/usage at the construction site.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A composite cementitious feedstock comprising a plurality of discrete elements, wherein each discrete element from said plurality of discrete elements includes
    mineral rock agglutinates, each of said agglutinates having irregular surface regions and cavities originating at said irregular surface regions,
    super absorbent polymer (SAP) particles, wherein at least a portion of said SAP particles are disposed on said irregular surface regions and in said cavities,
    cement particles, wherein at least a portion of said cement particles are disposed on said irregular surface regions and in said cavities, and
    a binder for cohering said agglutinates, said SAP particles, and said cement particles.

2. A composite cementitious feedstock as in claim 1, wherein each said discrete element further includes mineral sand particles, said mineral sand particles being at least partially coated with said SAP particles.

3. A composite cementitious feedstock as in claim 1, wherein said binder comprises a water soluble material.

4. A composite cementitious feedstock as in claim 1, wherein said binder is nonflammable.

5. A composite cementitious feedstock as in claim 1, wherein said binder comprises an encapsulating outer layer of said discrete element.

6. A composite cementitious feedstock as in claim 1, wherein said binder is dispersed throughout said discrete element.

7. A composite cementitious feedstock as in claim 1, wherein said binder comprises electrostatic charges within said discrete element for generating attractive forces between said mineral rock agglutinates, said SAP particles, and said cement particles.

8. A composite cementitious feedstock as in claim 1, further comprising reinforcement fibers dispersed throughout said discrete element.

9. A composite cementitious feedstock as in claim 1, further comprising a powder dispersed throughout said discrete element for absorbing electromagnetic energy in a range of 300 MHz to 300 GHz.

10. A composite cementitious feedstock as in claim 1, wherein at least a portion of said mineral rock agglutinates include nanophase iron coupled thereto.

11. A composite cementitious feedstock comprising a plurality of discrete elements, wherein each discrete element from said plurality of discrete elements includes
mineral rock agglutinates having sizes ranging from 250 microns to 1000 microns, each of said agglutinates having irregular surface regions and cavities originating at said irregular surface regions,
super absorbent polymer (SAP) particles having sizes ranging from 1 micron to 120 microns, wherein at least a portion of said SAP particles are disposed on said irregular surface regions and in said cavities,
cement particles having sizes ranging from sub-micron to 100 microns, wherein at least a portion of said cement particles are disposed on said irregular surface regions and in said cavities, and
a water soluble binder for uniting said agglutinates, said SAP particles, and said cement particles in said discrete element.

12. A composite cementitious feedstock as in claim 11, wherein each said discrete element further includes mineral sand particles having sizes ranging from 53 microns to 150 microns, said mineral sand particles being at least partially coated with said SAP particles.

13. A composite cementitious feedstock as in claim 11, wherein said water soluble binder is nonflammable.

14. A composite cementitious feedstock as in claim 11, wherein said water soluble binder comprises an encapsulating outer layer of said discrete element.

15. A composite cementitious feedstock as in claim 11, wherein said water-soluble binder is dispersed throughout said discrete element.

16. A composite cementitious feedstock as in claim 11, further comprising reinforcement fibers dispersed throughout said discrete element.

17. A composite cementitious feedstock as in claim 11, further comprising a powder dispersed throughout said discrete element for absorbing electromagnetic energy in a range of 300 MHz to 300 GHz.

18. A composite cementitious feedstock as in claim 11, wherein at least a portion of said mineral rock agglutinates include nanophase iron coupled thereto.

19. A composite cementitious feedstock as in claim 11, wherein said water soluble binder comprises 1-30 weight percent of said discrete element.

20. A composite cementitious feedstock comprising a plurality of discrete elements, wherein each discrete element from said plurality of discrete elements includes
mineral rock agglutinates having sizes ranging from 250 microns to 1000 microns, each of said agglutinates having irregular surface regions and cavities originating at said irregular surface regions,
super absorbent polymer (SAP) particles having sizes ranging from 1 micron to 120 microns, wherein at least a portion of said SAP particles are disposed on said irregular surface regions and in said cavities,
cement particles having sizes ranging from sub-micron to 100 microns, wherein at least a portion of said cement particles are disposed on said irregular surface regions and in said cavities, and
a water soluble binder for uniting said agglutinates, said SAP particles, and said cement particles in said discrete element, said water soluble binder comprising at least one of a dispersant dispersed throughout said discrete element and an encapsulating outer layer of said discrete element.

21. A composite cementitious feedstock as in claim 20, wherein each said discrete element further includes mineral sand particles having sizes ranging from 53 microns to 150 microns, said mineral sand particles being at least partially coated with said SAP particles.

22. A composite cementitious feedstock as in claim 20, wherein said water soluble binder is nonflammable.

23. A composite cementitious feedstock as in claim 20, further comprising reinforcement fibers dispersed throughout said discrete element.

24. A composite cementitious feedstock as in claim 20, further comprising a powder dispersed throughout said discrete element for absorbing electromagnetic energy in a range of 300 MHz to 300 GHz.

25. A composite cementitious feedstock as in claim 20, wherein at least a portion of said mineral rock agglutinates include nanophase iron coupled thereto.

26. A composite cementitious feedstock as in claim 20, wherein said water soluble binder comprises 1-30 weight percent of said discrete element.

\* \* \* \* \*